United States Patent
Gräber et al.

(10) Patent No.: US 9,841,051 B2
(45) Date of Patent: Dec. 12, 2017

(54) BALL JOINT WITH A LOADING-OPTIMIZED BALL SHELL

(71) Applicant: ZF Friedrichshafen AG, Friedrichshafen (DE)

(72) Inventors: Jürgen Gräber, Stemwede (DE); Martin Rechtien, Neuenkirchen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 15/026,711

(22) PCT Filed: Aug. 19, 2014

(86) PCT No.: PCT/EP2014/067626
§ 371 (c)(1),
(2) Date: Apr. 1, 2016

(87) PCT Pub. No.: WO2015/049077
PCT Pub. Date: Apr. 9, 2015

(65) Prior Publication Data
US 2016/0238064 A1    Aug. 18, 2016

(30) Foreign Application Priority Data

Oct. 2, 2013    (DE) .......................... 10 2013 220 038

(51) Int. Cl.
*F16C 11/06*    (2006.01)

(52) U.S. Cl.
CPC ........... *F16C 11/0638* (2013.01); *F16C 11/06* (2013.01); *F16C 2240/60* (2013.01)

(58) Field of Classification Search
CPC . Y10T 403/32631–403/32811; F16C 11/0628; F16C 11/0638; F16C 11/0685;
(Continued)

(56) References Cited

U.S. PATENT DOCUMENTS

| 1,809,703 A | 6/1931 | Hufferd et al. |
| 2,917,334 A * | 12/1959 | Baker ................. F16C 11/0633 403/140 |

(Continued)

FOREIGN PATENT DOCUMENTS

| DE | 38 43 331 A1 | 7/1989 |
| EP | 0 922 868 A2 | 6/1999 |

(Continued)

OTHER PUBLICATIONS

German Search Report Corresponding to 10 2013 220 083.2 dated Jun. 29, 2015.

(Continued)

*Primary Examiner* — Josh Skroupa
*Assistant Examiner* — Cory B Siegert
(74) *Attorney, Agent, or Firm* — Davis & Bujold, PLLC; Michael J. Bujold

(57) ABSTRACT

A ball joint, in particular for a wheel suspension of a motor vehicle, with a housing. A joint ball is arranged inside the housing and a ball shell is arranged therebetween. The outer surface of the joint ball contacts the inner surface of the housing and on its inner surface against the surface of the ball, such that the ball shell holds the joint ball so that it can move by sliding. The shell is elastic such that when a force acts upon the ball joint, the joint ball can move relative to the housing. As viewed in at least one cross-section plane passing through the mid-point of the ball, the ball shell has a radial thickness that varies, in the circumferential direction, in such manner that the force acting on the ball shell in the circumferential direction is distributed uniformly, particularly over enlarged areas thereof.

11 Claims, 3 Drawing Sheets

(58) Field of Classification Search
CPC .............. F16C 11/0623; F16C 11/0633; F16C 11/06–11/086
USPC .................................................. 403/122–144
See application file for complete search history.

(56) References Cited

U.S. PATENT DOCUMENTS

| | | | | |
|---|---|---|---|---|
| 2,970,853 | A * | 2/1961 | Baker | F16C 11/0604 403/125 |
| 3,375,028 | A * | 3/1968 | Patton | F16C 11/0638 403/126 |
| 4,318,627 | A * | 3/1982 | Morin | F16C 11/0638 403/133 |
| 4,586,840 | A * | 5/1986 | Buhl | F16C 11/06 267/279 |
| 4,722,631 | A * | 2/1988 | Tagami | F16C 11/0633 403/133 |
| 4,904,107 | A | 2/1990 | Fukukawa et al. | |
| 6,082,923 | A * | 7/2000 | Maughan | F16C 11/0638 403/135 |
| 6,213,675 | B1 | 4/2001 | Ungruh et al. | |
| 6,386,787 | B1 * | 5/2002 | Reichelt | F16C 11/0638 403/124 |
| 6,511,060 | B2 * | 1/2003 | Yamamoto | F16F 13/101 267/140.13 |
| 6,719,280 | B2 * | 4/2004 | Takashima | F16F 13/105 267/140.13 |
| 7,985,034 | B2 * | 7/2011 | Ruste | F16C 11/0638 403/133 |
| 2004/0227049 | A1 * | 11/2004 | Lang | B60R 1/066 248/476 |
| 2009/0080818 | A1 * | 3/2009 | Sasaki | F16C 11/0614 384/203 |

FOREIGN PATENT DOCUMENTS

| | | |
|---|---|---|
| FR | 1 089 843 | 3/1955 |
| FR | 2 543 633 A1 | 10/1984 |

OTHER PUBLICATIONS

International Search Report Corresponding to PCT/EP2014/067626 dated Nov. 6, 2014.
Written Opinion Corresponding to PCT/EP2014/067626 dated Nov. 6, 2014.

* cited by examiner

BALL JOINT WITH A LOADING-OPTIMIZED BALL SHELL

This application is a National Stage completion of PCT/EP2014067626 filed Aug. 19, 2014, which claims priority from German patent application serial no. 10 2013 220 038.2 filed Oct. 2, 2013.

FIELD OF THE INVENTION

The present invention concerns a ball joint, the use of a ball joint and a me hod for producing a ball joint.

BACKGROUND OF THE INVENTION

Ball joints known from the prior art comprise a housing inside which a ball is arranged. The ball is part of a ball stud, which projects outward through an opening of the housing. Between the ball and the housing there is a ball shell, whose thickness is constant all the way round the circumference, around the common axis. When this ball shell is loaded radially, as the load on the stud or ball increases the ball is displaced radially relative to the housing. This displacement takes place parallel to the direction of the force and results in a compression of the ball shell, which is maximum in the direction of the force. In the direction transverse to the force the ball shell is not compressed and therefore not loaded, because in this case the ball is displaced parallel to the surface of the ball shell. Along the circumference or equator of the ball, the compression and hence the loading of the ball shell varies according to the vector component of the surface normals to the force direction. Thus, the ball shell is very non-homogeneously loaded, so that particularly under high loads the ball shell can be overloaded in the more highly loaded areas. This can cause permanent damage to the ball joint.

The maximum load-bearing capacity of ball joints can be increased if the loading is distributed more uniformly over all areas, in such manner that the load is spread homogeneously over as wide an angular area as possible between the radial force direction—and the two transverse directions perpendicular thereto (the transverse and vertical axes). In this case the vertical axis corresponds to the longitudinal axis of the joint housing. For the vertical axis directed parallel to the longitudinal axis, it is known that the thickness of the ball shell is not constant, but corresponding to the various inside contours of the housing (cylindrical or partially spherical contours, contours with a ramp or a double ramp), has wall thicknesses that increase or vary toward the pole of the ball. In other words, the thickness of the ball shell varies in the direction of the vertical axis.

For the transverse axis, which runs parallel to the equatorial plane, in the prior art the wall thickness is always constant because the openings of the housing are for example produced by boring and are radially symmetrical relative to the vertical axis.

SUMMARY OF THE INVENTION

An objective of the present invention is to increase the load-bearing capacity of ball joints and to produce them more cheaply.

This objective is achieved by virtue of the characteristics and advantageous design features described below.

A ball joint is proposed, in particular one for a chassis component of a wheel suspension of a motor vehicle, such that the ball joint comprises a housing, a joint ball arranged inside the housing and, between these two, a ball shell. The joint ball is preferably part of a ball stud. In this case the ball stud is connected to the ball in a connection area, in particular integrally. The outer surface of the ball shell is in contact with the inner surface of the housing and its inner surface is in contact with the surface of the ball. Consequently the inner surface of the ball shell is preferably formed as the negative of the shape of the ball surface. The ball shell holds the joint ball so that it can move by sliding. Furthermore, the ball shell is formed elastically in such manner that when a force acts upon the ball joint, the ball can move relative to the housing. For that purpose the ball shell is preferably made of plastic.

In at least one cross-sectional view perpendicular to the vertical axis, in particular in a cross-section plane passing through the mid-point of the ball, the ball shell has a radial thickness that varies in the circumferential direction. The radial thickness of the ball shell is made variable in such manner that relative to the circumference, the force acting is distributed more uniformly and better over the whole of the ball shell, at least in an area bearing the main load, than it would be with a ball shell having a constant radial thickness all round.

Thanks to the variation of the ball she thickness in the circumferential direction, in an advantageous manner the force acting essentially at a point or locally can be distributed over a larger surface area of the ball shell. This loads the ball shell more uniformly, so that viewed as a whole the ball joint has a higher maximum load-bearing capacity. In this way, compared with the load-bearing capacity of known ball joints the load-bearing capacity of a ball joint designed according to the invention with the same nominal ball size can be increased by around 20-30%. In addition the size of the ball joint can be reduced since to withstand the same force the ball joint can be made smaller. Consequently such ball joints can be produced more favorably. Moreover, by virtue of such a variable radial thickness of the ball shell the life of ball joints can be extended.

The ball joint has a main load axis and a transverse axis directed perpendicularly to it. Depending on the type of ball joint, for example a radially loaded angled joint or a supporting joint, the main load axis is differently orientated. Thus, by definition the main load axis is that axis of the ball joint in the direction of which the force, in particular the largest force occurring, acts. To be able to distribute this force uniformly over a larger area or larger surface of the ball shell, it is advantageous for the cross-section of the ball shell to be thicker, in particular twice as thick in the area of the main load axis than in the area of the transverse axis.

A very good force distribution and optimum design of the ball shell can be achieved if the radial thickness of the ball shell in the circumferential direction decreases starting from the main load axis in the direction toward the transverse axis, at least within a range of angles. Preferably, the radial thickness of the ball shell decreases starting from the main load axis toward the transverse axis in a substantially steady or continuous manner. Corresponding to the angle between the load direction and the local normal vector of the surface, a cosine-shaped thickness profile with its maximum in the force direction (main loading direction) and its minimum in the transverse direction is ideal. This means that the thickness, or in other words the thickness of the material decreases from the largest to the smallest cross-section in a cosine-shaped manner.

An infinitely thin bearing shell would be equivalent to no bearing shell at all, which would lead to tribological disadvantages (for example seizing of the ball in the housing).

Because of the tolerance position (tolerances, which have to be allowed for in the production of the ball and the housing), an arbitrarily small wall cross-section thickness could no longer compensate different ball and housing pairings (leading to seizing or to play) and cannot separate the metallic surfaces tribologically from one another. Since an arbitrarily thin bearing shell cannot be produced and ultimately the area proportion of the ball shell close to the transverse direction cannot support any appreciable fraction of the force, for the thickness profile in the transverse direction a deviation from the cosine profile and therefore a finite thickness is advantageous.

It is advantageous for the range of angles between the force direction or main load axis and the transverse direction to extend between 30° and 80°, preferably being 60°. In that range of angles, on both sides of the main load axis a very good distribution of the force applied can be achieved if the radial thickness of the ball shell in this area decreases in the direction toward the transverse axis.

A very good force distribution can be produced if the outer contour of the ball shell, in cross-section, is formed in at least one of its two part-segments by a first and a second part-circle, which intersect preferably in the area of the respective ends of the range of angles. In this way the first part-circle can be designed optimally for the distribution of the force applied. In contrast, the second part-circle can be dimensioned such that in the area in which it is not appreciably compressed by the force in the main loading direction, the ball shell has a finite thickness, whereby in turn the above-mentioned tolerance and production problems can be avoided.

In other words, in the main loading area a first part-segment of the outer contour of the ball shell is produced by displacing the inner contour in the direction of the force. As a result the thickness of the ball shell projected in the force direction is equal overall in this part-segment. Outside the main loading area the ball shell is only slightly compressed and therefore, in its second part-segment, has a finite thickness whereby again tolerance and production problems can be avoided.

For a good load distribution it is advantageous for the mid-point of the first part-circle to be positioned eccentrically relative to the mid-point of the ball and on the main load axis. In addition or alternatively, it is advantageous for the radius of the first part-circle to correspond to the radius of the ball.

Furthermore, it is advantageous for the mid-point of the second part-circle to be positioned concentrically with the mid-point of the ball and for the radius of the second part-circle to be larger than the ball radius. In this way, even in those areas where it is not, or is only slightly compressed, the ball shell will be sufficiently thick, whereby tolerance and production problems can be avoided.

To reduce the production costs of the housing contour and ultimately that of the ball joint, it is advantageous for the idealized ball shell formed by the two part-circles to be made in a shape that approximates them but is easier to produce. For this, preferably at the transition point of the two part-segments or part-circles the two contours are approximated, so that they preferably merge tangentially into one another. The result of this procedure is that the thickness projected or produced in the main load or force direction amounts in the main loading area to around 1 to 3 times the radial thickness outside the main loading area, depending on the angle range.

Regarding this, it is therefore advantageous for the outer contour of the ball shell, in at least one of its two part-segments, to be formed at least as part of an ellipse or oval, in particular one that is concentric with the mid-point of the ball joint. In this case the main load axis preferably forms the major axis of the ellipse or oval. Such partly elliptical or oval-shaped contours can be produced very accurately and inexpensively by known production methods (such as CNC milling techniques).

Furthermore, it is advantageous for the outer contour of the ball shell to be in the form of a complete ellipse or ellipse-like contour, in particular extending over both part-segments. In this way an easy-to-produce thickness profile of the ball shell can be made, which is able to distribute the essentially punctiform or locally acting force very well over a sufficiently large area of the ball shell in the area of the main load axis.

Considering the ball shell in three dimensions, it is advantageous for it to be formed not only in the transverse direction, but also in the direction of the vertical or longitudinal axis as at least part of an ellipsoid, a cylinder with an elliptical footprint or an ovoid. In this way the force acting can be distributed not only two-dimensionally in the circumferential direction, but three-dimensionally over a part-area of the corresponding three-dimensional body mentioned above. Consequently the ball joint can absorb even higher loads. Since the production and assembly of such a ball shell are more complex when corresponding housing contours are realized in both axis directions, it should be considered whether the above contours are used only in one axis direction for example toward the bottom of the housing and the contours in the direction of the vertical axis parallel to that axis direction should be formed, for example, as a prism with an elliptical footprint.

It is advantageous for the inner contour of the housing and/or the inner surface of the housing to correspond to the negative of the shape of the outer contour and/or the outer surface of the ball shell. In this way intimate contact of the ball shell against the inner contour of the housing and/or the inner surface of the housing can be ensured, whereby the otherwise punctiform or locally acting force can be distributed over a larger area of the ball shell. The term "contour" used above describes a shape extending in two-dimensions, in particular when viewed in section, whereas the term "surface" describes a shape extending in three dimensions.

It is advantageous for the thickness of the ball shell to vary in a range between 1 mm and 3 mm. Owing to this small difference, circular covers or sealing rings can advantageously also be used. The ratio of the smallest to the largest wall depth (thickness) of the ball shell thus amounts to around 1:3.

To be able to compensate for thermal expansions of the ball joint, it is advantageous for the ball shell to have one or more slits spaced apart from one another in the circumferential direction of the ball. It is understood that the slits do not extend essentially in the main load direction. Since the ball shell is hardly loaded at all in the transverse direction and can actually be arbitrarily thin, it is advantageous for the slits to be positioned in the transverse direction. Thanks to the slits, seizing of the joint ball in the ball shell can be avoided, since by virtue of the slits, if it becomes hot the ball shell can expand in the circumferential direction within a certain tolerance range.

The invention also concerns a method for producing a housing for a ball joint as described above. In this case an inner contour that deviates from a circular inner contour, in particular an elliptical or oval inner contour is preferred, so that a ball shell reinforced in the main load direction with an elliptical or oval outer contour can be accommodated. The housing is preferably made by cold forming. In particular, the housing is made without any machining or finish-machining of the inner contour. The close-fitting inner contour is produced by one or a few deformation processes, in particular in a final deformation process. In the last, or last few deformation processes the inner contour is calibrated (brought to its final dimensions). This enables a particularly inexpensive production of a housing and, ultimately, of the ball joint as a whole. Alternatively, the inner contour can be produced by a machining process, for example by NC milling methods.

Preferably, the ball joint with its special inner housing contour is designed as an angled joint, a radial joint, a supporting joint or a sleeve joint. In its various versions the ball joint is used in chassis components such as two-point links, multi-point links or the like.

As regards the cold forming process it is advantageous for the ball joint to be made as a push-in joint, in particular a sleeve joint, wherein the housing has a cylindrical outer surface on which a groove or flat (for example a key flat) is formed to assist orientation during assembly. Owing to their symmetrical form, housings of sleeve joints can be made particularly easily by a cold forming process.

A ball joint has a pole axis and an equator. By definition the pole axis extends between the two poles of the joint ball a distance apart, one of these two poles being located in the connection area with the ball stud. The equator extends concentrically with and perpendicularly to the pole axis in the central plane of the joint ball. The above orientations of the pole axis and the equator correspond to the undeflected condition of the ball joint.

It is advantageous for the ball joint to be a radially loaded, for example an angled or guiding joint, and in that application case a main load axis transverse to the pole axis and in particular perpendicular thereto lies in the equatorial plane. In addition or alternatively, it is also advantageous for the ball joint to be designed as a supporting joint, and in that case the main load axis is between the pole axis and the equatorial plane.

BRIEF DESCRIPTION OF THE DRAWINGS

Below, the invention is explained in greater detail with reference to drawings, which show.

DETAILED DESCRIPTION OF THE PREFERRED EMBODIMENTS

Figure 1:
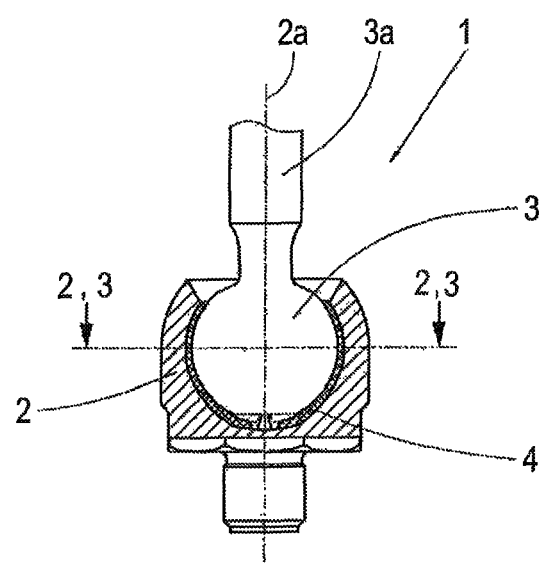
FIG. 1: A partially sectioned view of a ball joint.

FIG. 1 shows a partially sectioned view of a ball joint 1 with a housing 2 and a ball 3 arranged at an end of a ball stud 3a. Between the ball 3 and the housing 2 a ball shell 4 is provided. The ball joint 1 is shown in its undeflected position. The longitudinal axis 2a of the housing 2 extends along the longitudinal and symmetry axis of the ball stud 3a. Section lines 2-2 and 3-3 are shown, which relate to FIGS. 2 and 3.

Figure 2:
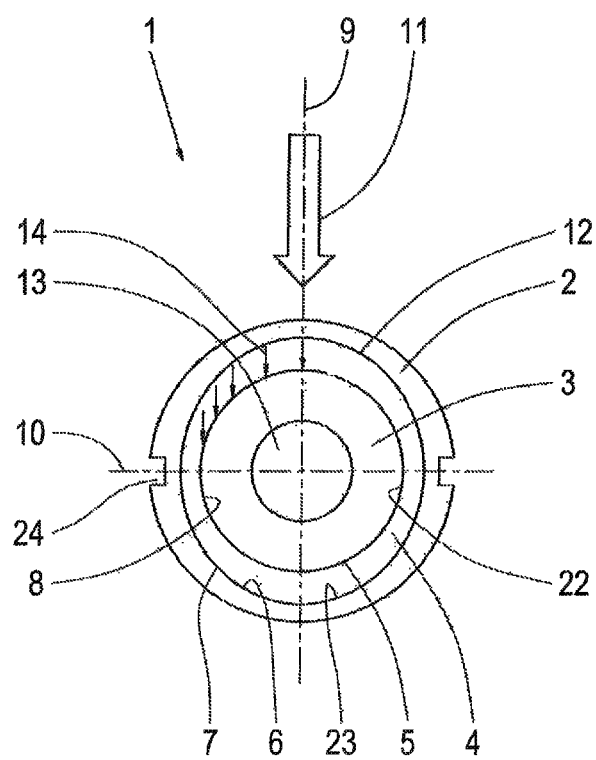
FIG. 2: A ball joint according to FIG. 1, shown in section along the line 2-2.

FIG. 2 shows a cross-section of a ball joint 1. The housing 2 has a ball-shaped outer surface in which a groove 24 is formed for assembly orientation purposes. The joint ball 3 is arranged in the inside space of the housing 2. The joint ball 3 is part of a ball stud 3A shown in FIG. 1. The ball shell 4 is arranged radially between the joint ball 3 and the housing 2. The joint ball 3 has a spherically shaped ball surface 5. In contrast, the housing 2 has a housing inner surface 6 that deviates from this, which will be described in more detail below. The outer surface 7 of the ball shell 4 is in intimate contact with inner surface 6 of the housing. Moreover, the inner surface 8 of the ball shell 4 is in contact with the ball surface 5 in such manner that the joint ball 3 is held in, but able to move by sliding within the ball shell 4. Possibly present lubrication grooves are not shown.

The ball joint 1 has a main load axis 9 and a transverse axis 10 directed perpendicularly thereto. In addition the ball joint has a vertical axis 2a, which coincides with the longitudinal axis of the housing. The main load axis 9 is defined in such manner that in its direction an external force 11 acts upon the ball joint 1. The ball shell 4 is made elastic to the extent that when the force acts, the joint ball 3 can move relative to the housing 2.

Ball shells 4 known from the prior art have a constant radial thickness in the circumferential direction. However, this has the disadvantage that the ball shell 4 is very severely loaded at the essentially punctiform or local points of action of the force 11 in the area of the main load axis 9, and much less severely loaded in the areas a distance away from the main load axis 9. Consequently, the ball shell 4 may be overloaded in the area of the main load axis 9.

To avoid this problem the ball shell 4 shown in FIG. 2, as viewed in the cross-section therein represented, has a radial thickness that varies in the circumferential direction in such manner that the force 11 acting in the circumferential direction is distributed uniformly over a larger area of the ball shell 4. For this, as seen in cross-section the ball shell 4 is about twice as thick in the area of the main load axis 9 as it is in the area of the transverse axis 10. As shown in the concrete example embodiment illustrated in FIG. 2, in the plane pictured the ball shell 4 has an elliptical outer contour 12. The housing 2 has an inner housing contour 23 and/or an inner housing surface 6 which correspond to the negative of the shape of the outer contour 12 and/or the outer surface 7 of the ball shell 4. In this context the term "contour" denotes a shape that extends two-dimensionally in the sectional view shown in FIG. 2, whereas the term "surface" is used in what follows for three-dimensional shapes.

According to FIG. 2, considering only one of the two part-segments the radial thickness of the ball shell 4 decreases steadily in the circumferential direction starting from the main load axis 9 in the direction toward the transverse axis 10 over a range of angles 13. In the present example embodiment the range of angles 13 amounts essentially to 60°, but ranges between 30° and 80° would also be conceivable. Owing to the elliptical shape of the outer contour 12 of the ball shell 4, the essentially punctiform or local action of the force 11 in the angle range 13 on either side of the main load axis 9 is distributed substantially uniformly, so that overloading of the ball shell 4 is avoided. In FIG. 2 the force 14 distributed over the circumferential and/or surface area of the ball shell 4 is smaller compared with the force 11, as indicated by the arrows of equal length.

Figure 3:
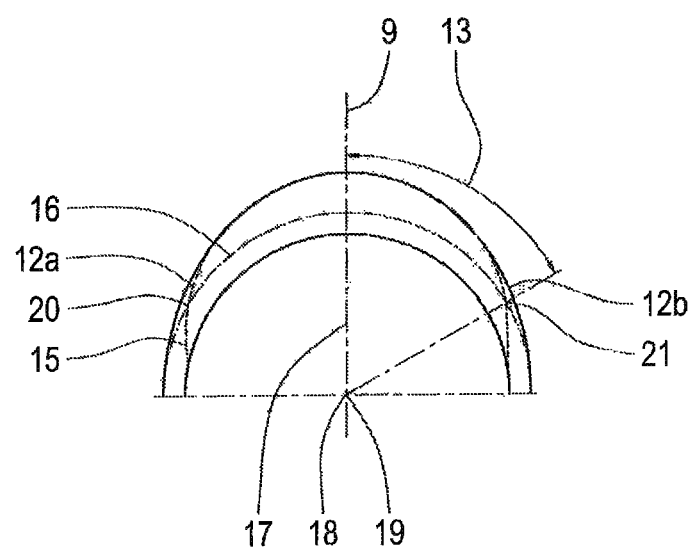
FIG. 3: A special partial view of a ball shell, shown in section along the section line 3-3.

FIG. 3 shows a schematic sectioned representation of the ball shell 4 viewed as a partial segment. As already explained earlier, the decisive feature is that the ball shell 4 has a larger radial thickness in the area where the force 11 is applied (see FIG. 2) than in the areas on both sides farther away from the main load axis 9.

According to a first example embodiment of the ball shell 4 shown in FIG. 3, an optimum distribution of the force 11 over the ball shell 4 can be achieved if the ball shell 4 or its outer contour 12a, seen in cross-section in the half-segment view shown here, is composed of a first part-circle 15 and a second part-circle 16. In this case the mid-point 17 of the first part-circle 15 is displaced eccentrically relative to the mid-point 18 of the ball. Furthermore, the mid-point 17 of the first part-circle 15 lies on the main load axis 9. For the optimum radial thickness adaptation, the radius of the first half-circle 15 is equal to the radius of the ball.

In contrast, the mid-point 19 of the second part-circle 16 is arranged concentrically and coincident with the mid-point 18 of the ball. The radius of the second part-circle 16, however, is larger than the ball radius. In the half-segment represented in this case the two part-circles 15, 16 intersect at first and second intersection points 20, 21, thereby forming the outer contour 12a. Preferably, starting from the main load axis 9 and moving toward the transverse axis 10, these two intersection points 20, 21 are located at the ends of the respective angle ranges 13—of which only one is indicated in this illustration. An outer contour 12a consisting in this manner of the first and second part-circles 15, 16 results in a very good distribution of the force 11 over the angle range 13. However, in this case the outer contour has a rather complex design.

In an alternative, second example embodiment of the ball shell 4 also shown in FIG. 3, the outer contour 12b has an elliptical shape. This elliptical outer contour 12b approximates the outer contour 12a of the first example embodiment. However, by virtue of its elliptical shape the outer contour 12b of the ball shell 4 can be made more easily while accepting only a slight loss of the quality of the force distribution. In other words, during the production of the ball shell the intersection point 21 is displaced toward the outer contour 12b, in such manner that the overall shape of the outer contour is more homogeneous.

The elliptical outer contour 12 of the ball shell 4 shown in FIGS. 2 and 3, considered in three dimensions, forms the outer surface 7 of the ball shell 4. In an example embodiment not shown here this outer surface 7 can be formed as an ellipsoid or as a cylinder with an elliptical footprint. In this way, in the case of the ellipsoid the force distribution can take place not only two-dimensionally in the circumferential direction but three-dimensionally, over a corresponding force absorption surface of the ball shell 4. It is advantageous to shape the three-dimensional hollow space of the housing or its inner contour in such manner that the half-space toward the bottom is an ellipsoid and the half-space toward the opening of the housing is a cylinder with an elliptical footprint. That shape can be produced easily by cold forming.

The present invention is not limited to the example embodiments illustrated and described. Deviations in the context of the claims are possible, as also are combinations of the features, even if the latter are shown and described in the context of different example embodiments.

INDEXES

1. Ball joint
2. Housing
2a Longitudinal axis, vertical axis
3. Joint ball
4. Ball shell
5. Ball surface
6. Inner surface of the housing
7. Outer surface of the ball shell
8. inner surface of the ball shell
9. Main load axis, main load direction
10. Transverse axis
11. Force
12, 12a, 12b Outer contour of the ball shell
13. Angular range
14. Distributed force
15. First part-circle
16. Second part-circle
17. Mid-point of the first part-circle
18. Mid-point of the ball
19. Mid-point of the second part-circle
20. First intersection point
21. Second intersection point
22. Inner contour of the ball shell
23. Inner contour of the housing
24. Groove

The invention claimed is:

1. A ball joint with
a housing (2),
a joint ball (3) being arranged inside the housing (2),
a ball shell (4) being arranged between the housing and the joint ball, an outer surface (7) of the ball shell butting against an inner surface (6) of the housing and an inner surface (8) of the ball shell butting against a surface (5) of the joint ball,
the ball shell (4) holding the joint ball (3) so that the joint ball is slidably movable and the ball shell being made elastic in a manner such that when a force (11) acts upon the ball joint (1), the joint ball (3) being movable relative to the housing (2),
the ball shell (4) having a circular inner contour (22) in a cross-section plane passing through a mid-point (18) of the joint ball,
an outer contour (12) of the ball shell being formed in such a manner that the ball shell (4) is thicker in an area of a main bad axis (9), in the cross-section plane, than in an area of a transverse axis (10) that is perpendicular to the main load axis,
the transverse axis (10) dividing the outer contour (12) of the ball shell into first and second part-segments,
in at least one of the first and the second part-segments, the outer contour (12) of the ball shell (4) being formed by first and second part-circles (15; 16), which intersect at two intersection points (20, 21) symmetrically positioned relative to the main load axis (9),
a mid-point (17) of the first part-circle (15) being arranged eccentrically relative to the mid-point (18) of the joint ball, and being located on the main load axis (9), and being arranged inside the corresponding part-segment, and a radius of the first part-circle (15) corresponding to a radius of the joint ball, and
a mid-point of the second part-circle (16) being arranged concentrically with the mid-point (18) of the joint ball and a radius of the second part-circle (16) being larger than the radius of the joint ball, so that at least in the cross-section plane the ball shell (4) having a radial thickness that varies in a circumferential direction in such a manner that a force (11) acting coaxially with the main load axis (9) being distributed uniformly over the ball shell (4) in the circumferential direction over a range of angles (13).

2. The ball joint according to the claim 1, wherein in at least one of the first and the second part-segments of the ball shell is formed by the transverse axis (10), the thickness of the ball shell (4) continuously decreases in the circumferential direction starting from the main load axis (9) in the circumferential direction toward the transverse axis (10), at least within the range of angles (13).

3. The ball joint according to claim 1, wherein the range of angles (13) extends between 30° and 80°.

4. The ball joint according to claim 1, wherein at least one of:
- contours of the first and the second part-circles (15, 16) in their two transition areas approximate to one another, so that the contours of the first and the second part-circles merge tangentially into one another, and
- the outer contour (12b) of the ball shell (4), in cross-section, is formed in at least one of the first and the second part-segments at least as part of an oval and is concentric with the raid-point (18) of the joint ball such that the main load axis (9) forms a major axis of the oval.

5. The ball joint according to claim 1, wherein the outer surface (7) of the ball shell (4) is in a form of at least part of an ovoid in at least one of the first and the second part-segments thereof.

6. The ball joint according to claim 1, wherein at least one of:
- an inner contour (23) of the housing corresponds to a negative of a shape of the outer contour of the ball shell, and
- the inner surface (6) of the housing corresponds to the negative of the outer surface (7) of the ball shell (4).

7. The ball joint according to claim 1, wherein the thickness of the ball shell (4) varies in a range between 1 mm and 3 mm.

8. The ball joint according to claim 1, wherein the housing (23) has an outer surface in which either a groove (24) or a flat is formed for orientation during assembly.

9. A method of producing ball joint having a housing (2), a joint ball (3) is arranged inside the housing (2), a ball shell (4) is arranged between the housing and the joint ball, an outer surface (7) of the ball shell butts against an inner surface (6) of the housing and an inner surface (8) of the ball shell butts against a surface (5) of the joint ball, the ball shell (4) holds the joint ball (3) so that the joint ball is slidably movable and the ball shell is made elastic in a manner such that when a force (11) acts upon the ball joint (1), the joint ball (3) is movable relative to the housing (2), in a cross-section plane passing through a mid-point (18) of the joint ball, the ball shell (4) has a circular inner contour (22), and an outer contour (12) of the ball shell is formed in such a manner that in the cross-section plane, the ball shell (4) is thicker in an area of a main load axis (9) than in an area of a transverse axis (10) that is perpendicular to the main load axis, the transverse axis (10) divides the outer contour (12) of the ball shell into first and second part-segments, in at least one of the first and the second part-segments, the outer contour (12) of the ball shell (4) is formed by first and second part-circles (15; 16), which intersect at two intersection points (20, 21) symmetrically positioned relative to the main load axis (9), a mid-point (17) of the first part-circle (15) is arranged eccentrically relative to the mid-point (18) of the joint ball, and is located on the main load axis (9), and is arranged inside the corresponding part-segment, and a radius of the first part-circle (15) corresponds to a radius of the joint ball, and a mid-point of the second part-circle (16) is arranged concentrically with the mid-point (18) of the joint ball and a radius of the second part-circle (16) is larger than the radius of the joint ball so that, at least in the cross-section plane, the ball shell (4) has a radial thickness that varies in a circumferential direction in such a manner that a force (11) acting coaxially with the main load axis (9) is distributed uniformly over the ball shell (4), in the circumferential direction, over a range of angles (13), the method comprising:
- producing either the housing (2) and its oval inner housing contour (23) by a single-step process or a multi-step cold forming process.

10. The method for producing a ball joint according to claim 9, further comprising producing the inner housing contour (23) exclusively without machining.

11. A ball joint comprising:
- a housing having an inner surface;
- a ball shell being received within the housing such that an outer surface of the ball shell mates with the inner surface of the housing, and the ball shell having an inner surface;
- a joint ball being connected to a ball stud defining a longitudinal axis, the joint ball being received within the ball shell such that an outer surface of the joint ball mates with the inner surface of the ball shell, and the joint ball being slidably supported by the inner surface of the ball shell, and the ball shell being elastic such that the joint ball is movable relative to the housing when a force acts on the ball joint;
- in a cross-section plane extending normal to the longitudinal axis and passing through a mid-point of the joint ball, the ball shell having a circular inner contour and an outer contour such that, in the cross-section plane, a thickness of the ball shell along a main load axis being greater than a thickness of the ball shell along a transverse axis that is perpendicular to the main load axis;
- the transverse axis dividing the outer contour into a first part-segment and a second part-segment,
- in at least one of the first and the second part-segments, the outer contour of the ball shell being formed by first and second part-circles which intersect at two intersection points symmetrically positioned relative to the main load axis,
- a mid-point of the first part-circle being arranged eccentrically relative to the mid-point of the joint ball, and the mid-point of the first part-circle being located on the main load axis and arranged inside the corresponding part-segment, and a radius of the first part-circle being the same as a radius of the joint ball, and
- a mid-point of the second part-circle being the same as the mid-point of the ball and a radius of the second part-circle being larger than a radius of the joint ball such that at least in the cross-section plane, the ball shell having a radial thickness that varies in a circumferential direction in such a manner that a force directed along the main load axis being distributed uniformly over the ball shell in the circumferential direction over a range of angles.

* * * * *